United States Patent

[11] 3,547,151

[72] Inventors: Benjamin H. Kryzer and Edward J. Tischler, St. Paul, Minn.
[21] Appl. No.: 704,637
[22] Filed: Feb. 12, 1968
[45] Patented: Dec. 15, 1970
[73] Assignee: By mesne assignments, to Union Tank Car Company Chicago, Ill. a corporation of Delaware

[54] VALVE ASSEMBLY
4 Claims, 6 Drawing Figs.
[52] U.S. Cl. ................................. 137/599.1, 251/367
[51] Int. Cl. ................................. B01d 29/38, C02b 1/16
[50] Field of Search ............... 137/599.1; 251/367; 210/190, 191

[56] References Cited
UNITED STATES PATENTS
| | | | |
|---|---|---|---|
| 2,539,221 | 1/1951 | Badeaux | 137/599.1 |
| 2,792,017 | 5/1957 | Wiczer | 137/599.1 |
| 2,832,373 | 4/1958 | Scholer | 251/367X |
| 3,215,273 | 11/1965 | Kryzer | 210/191X |
| 3,352,419 | 11/1967 | Entringer et al. | 210/190X |

Primary Examiner—Robert G. Nilson
Attorneys—Hume, Clement, Hume & Lee and Charles M. Kaplan ABSTRACT: An actuator valve assembly for use with a main valve assembly in controlling the flow of water through a water conditioning system. The actuator valve assembly includes four individual valves arranged in a single valve body, two of the valves serving to control water flow to a brine tank and brine flow therefrom. One of these two valves is a double acting valve which, in a second valve function, assures correct liquid flow during a brining cycle. The remaining two valves of the actuator valve assembly cooperate to control waste flow to drain.

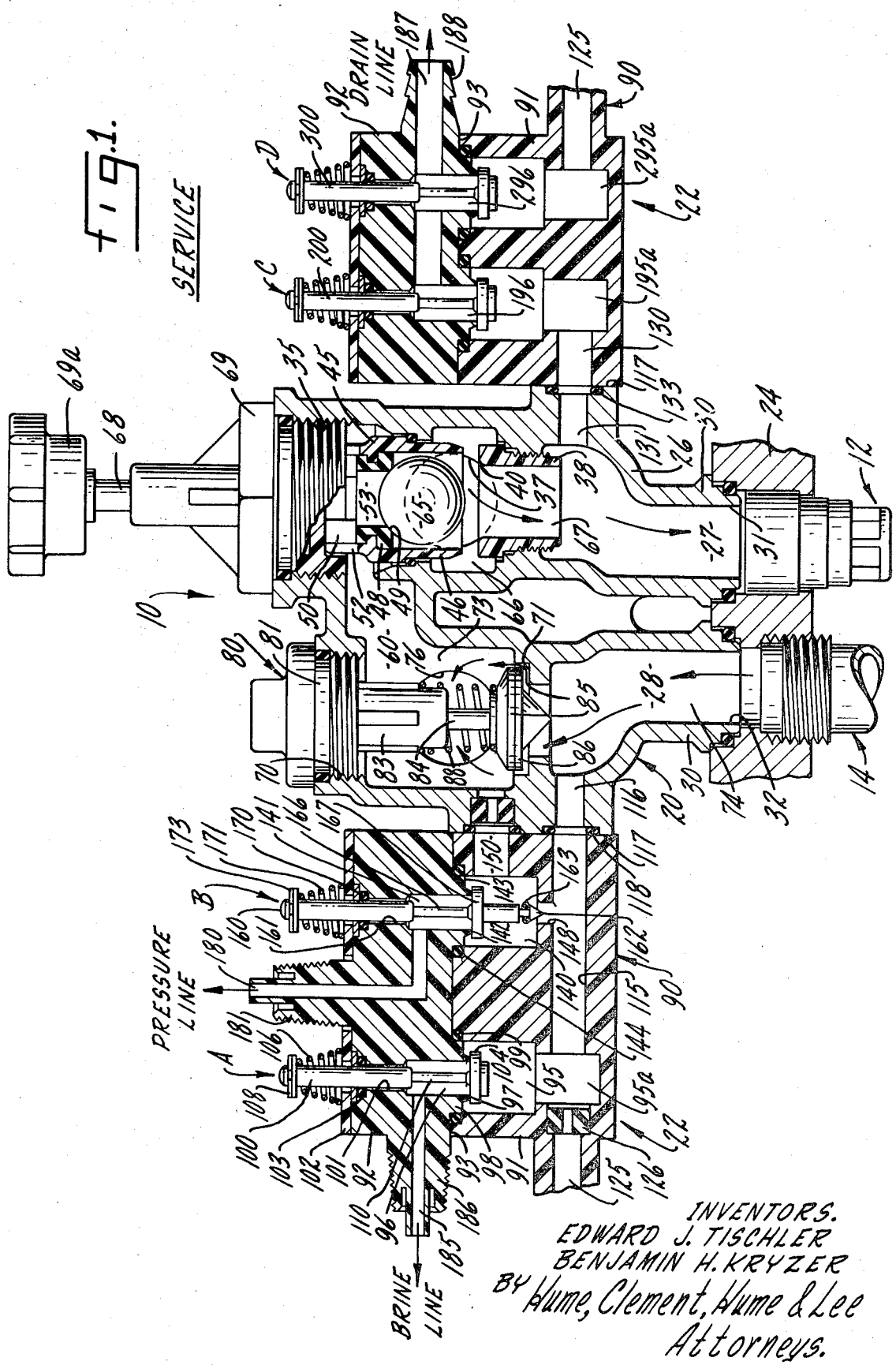

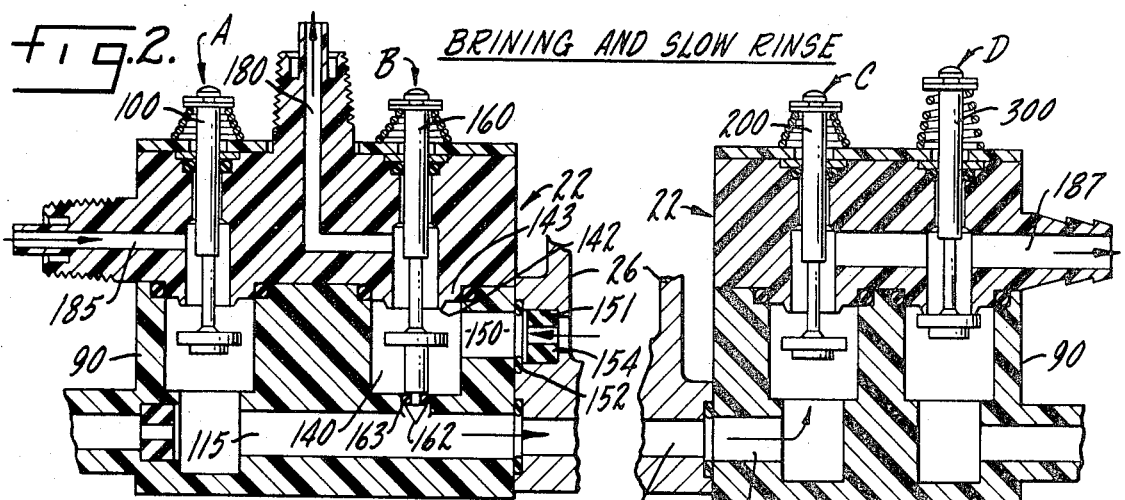
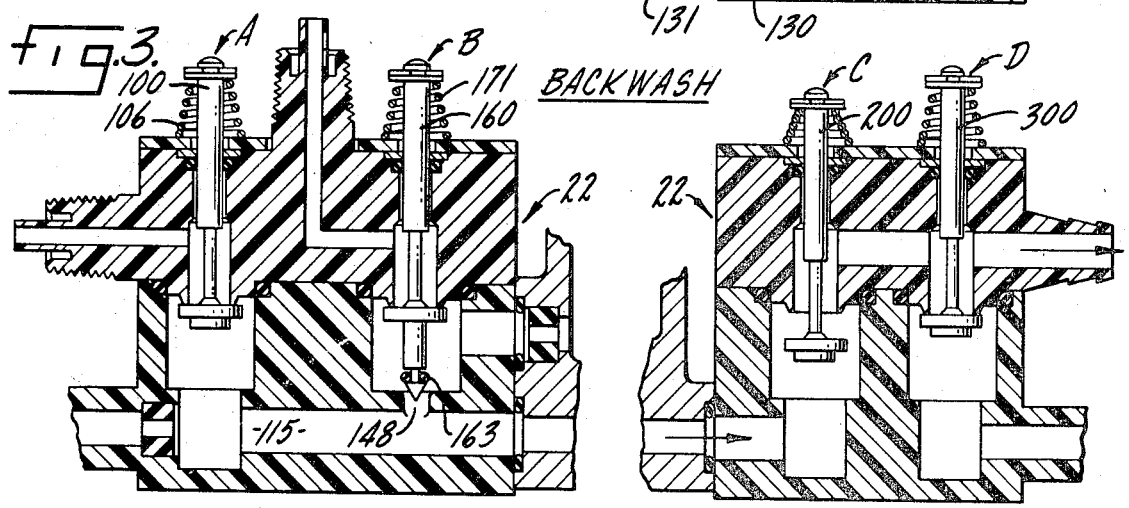
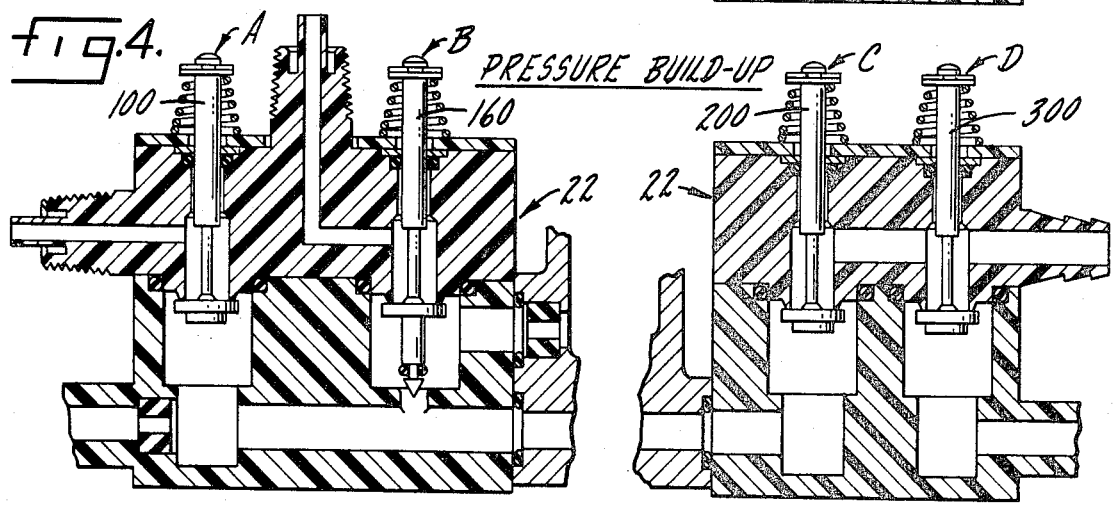

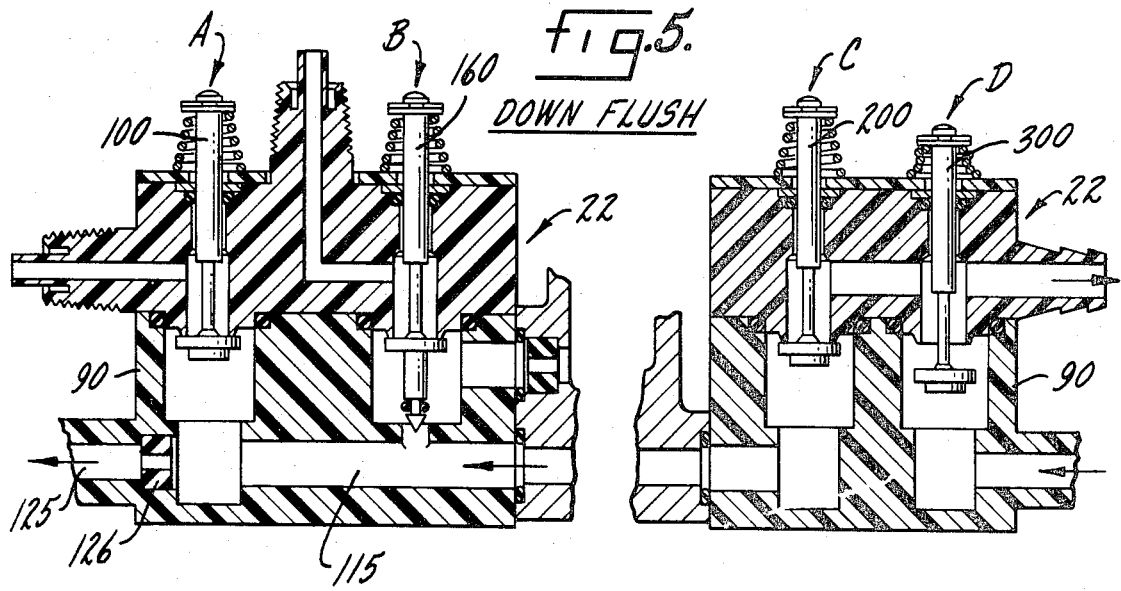
Fig. 5. DOWN FLUSH
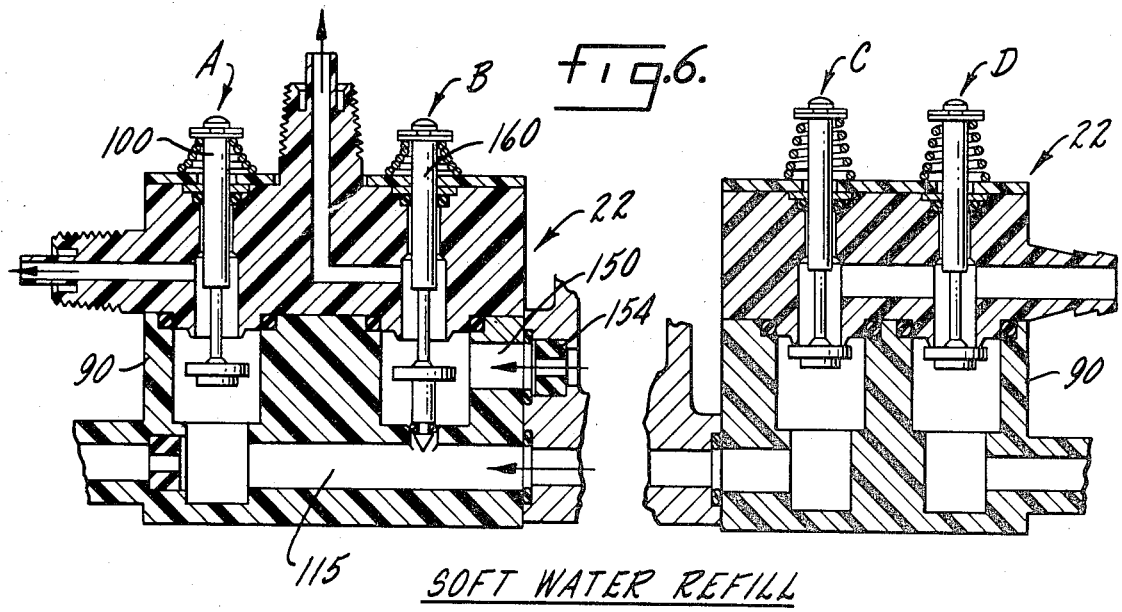
Fig. 6. SOFT WATER REFILL

VALVE ASSEMBLY

This invention relates in general to water conditioning. It deals more particularly with the control of water conditioning operations, including normal service and conditioning medium regeneration.

Water conditioning of a generally conventional nature comprises treatment of the water during normal service and then regeneration of the treatment medium during a regeneration period. Normal service treatment includes the passage of hard water, for example, through a tank containing a resin capable of removing hardness inducing ions from the water. As the water flows through the resin bed, the resin removes these ions, creating soft water which flows out of the tank to service lines.

Depending upon the specific characteristics of the hard water being treated, it might also be passed through a clarifier to remove silt, clay, etc. a neutralizer to counteract acidity, and an oxidizing filter to remove ferric iron from the water, for example, all before the resin treatment to soften the water. After the softening, the water is sometimes filtered for taste and odor.

The basic treatment is, however, the softening treatment effected by the resin in the treatment tank and referred to as "water softening". At preset time intervals during this softening process, the bed of resin in the treatment tank requires regeneration to remove the hardness inducing ions attached to the resin and restore the resin's ability to remove these ions from hard water at a satisfactory rate.

This is ordinarily accomplished by passing a brine solution through the bed of resin in the treatment tank. Sodium ions from the brine exchange places with calcium and magnesium ions and the like attached to the resin and the calcium and magnesium ions are carried out to drain with the treatment brine.

In addition to the brining cycle in the regeneration process, it is conventional to treat the bed or resin in one or more other cycles. These include the passage of water through the resin bed in the direction of normal service water flow and, also, in a direction opposite to normal service flow. These rinse, backwash, and/or down-flush cycles, as they are referred to, might be performed at various flow rates. Regardless, a control valve arrangement of one type or another is ordinarily employed to control normal service treatment and regeneration in a water conditioning system at the behest of a suitable timing device. Examples of such valve arrangements are illustrated in the Kryzer U.S. Pats. No. 3,215,273 and No. 2,999,514.

It is an object of the present invention to provide an improved valve arrangement for controlling water conditioning. It is a further object to provide a valve arrangement which includes a new and improved actuator valve assembly. The actuator valve assembly is cam operated from a suitable device; one such as illustrated in the copending Tischler application, Ser. No. 679,722, filed Nov. 1, 1967, now U.S. Pat. No. 3,448,625, and assigned to the same assignee as the present invention.

The actuator valve assembly appropriately actuates and cycles regeneration of the conditioning system through a main valve assembly connected directly to the service lines and the treatment tank. The main valve assembly provides the locus for service water inlet and outlet and, in addition, contains the inlet and outlet valves which primarily control water flow to and from the treatment tank through conventional baffle and distributor means. The construction and operation of the main valve assembly is, in general, conventional. The invention resides in the construction and arrangement of the actuator valve assembly, per se, and its relationship to the main valve assembly.

The actuator valve assembly embodying features of the invention is unitary in construction and its attachment to the main valve assembly is ultimately simple. In this light, various main valve assembly constructions readily adapt themselves to use with the actuator valve assembly of the invention. Used with any of these main valve assemblies, the actuator valve assembly initiates and cycles regeneration, controls water flow to and brine flow from the brine tank, and controls waste water and brine flow to drain.

The actuator valve assembly includes four individual valves arranged in a single valve body and interconnected by an arrangement of passages according to the invention. Two of these valves cooperate in controlling water flow to the brine tank and brine flow therefrom. One of these two valves is a double-acting valve which, in a second valve function, assures correct liquid flow in a brining cycle; particularly preventing the contamination of service water with brine. The remaining two valves cooperate in controlling waste flow to drain. The valves and connecting passages are simply arranged in optimum relationship to afford superior initiation and control of regeneration with a simple and inexpensive valve assembly that can be readily adapted for use with numerous main valve units or assemblies.

The invention, both as to its organization and method of operation, taken with further objects and advantages thereof, will best be understood by reference to the following description taken in connection with the following drawings, in which:

FIG. 1 is a diagrammatic front elevational view of a main control valve assembly with an actuator valve assembly embodying features of the present invention attached; the actuator valve assembly being split in plane perpendicular to the plane of the drawing and separated into half sections for ease of illustration and description; the arrangement is in its "service" cycle setting;

FIG. 2 is a view similar to FIG. 1, with the detail of the main valve assembly removed, illustrating the arrangement and, specifically, the actuator valve assembly in its "brining and slow rinse" cycle setting;

FIG. 3 is a view similar to FIG. 2 illustrating the actuator valve assembly in its "backwash" cycle setting;

FIG. 4 is a view similar to FIG. 2 illustrating the actuator valve assembly in its "pressure buildup" cycle setting;

FIG. 5 is a view similar to FIG. 2 illustrating the actuator valve assembly in its "down-flush" cycle setting; and FIG. 6 is also a view similar to FIG. 2, illustrating the actuator valve assembly in its "soft water refill" cycle setting.

Referring now to the drawings, and particularly to FIG. 1, a water conditioning system control valve arrangement embodying features of the present invention is illustrated generally at 10. The system itself is broadly conventional and, accordingly, is not illustrated. It includes a water treatment tank containing a bed of particulate material through which water to be treated is passed. The particulate material is a suitable resin, of the type widely used in water softeners or the like, which has the capacity of removing hardness inducing ions such as calcium and magnesium from the water passed through it.

In normal service operation of the water conditioning system, the control valve arrangement 10 directs service water from an inlet service line into a tank through a top baffle 12, through the particulate material and out of the tank through a distributor (not shown) and pipe 14 to the outlet service line. Flow of service water in the aforedescribed pattern continues for a prescribed length of time determined by a timing device of the type shown in the aforementioned Tischler application, for example.

The control valve arrangement 10 comprises a main valve assembly 20 and an actuator valve assembly 22. The main valve assembly 20 is mounted on top of the treatment tank, a portion of which is shown at 24, in suitable relationship with the baffle 12 and distributor pipe 14. The actuator valve assembly 22 is separably mounted on the main valve assembly 20 according to the invention.

The main valve assembly 20 comprises a cast brass body 26. Formed within the body 26 is a vertically disposed inlet passage 27 and a generally parallel, vertically disposed outlet passage 28. The inlet and outlet passages 27 and 28 terminate in a suitably formed base 30 of the body at corresponding ports 31 and 32, respectively. The base 30 of the body 26 is seated in sealing relationship on the top 24 of the tank, as has been pointed out, with the ports 31, 32 communicating with the baffle 12 and distributor pipe 14, respectively.

The inlet passage 27 extends from a threaded opening 35 in the top of the body 26 downwardly through the body to the aforementioned port 31. Intermediate the ends of the passage, a raw water inlet port 37 is formed through the body into the passage. The raw water inlet port 37 is connected to a service inlet line in a conventional manner.

Immediately below the inlet port 37 in the passage 27, a generally cylindrical plastic lower sleeve 38 is seated. The sleeve 38 is threaded into the passage 27 in a conventional manner and defines an annular valve seat 40 formed at its upper, inner periphery.

Immediately above the inlet port 37, a generally cylindrical plastic upper sleeve 45 is seated in the passage 27. The sleeve 45 includes a lower cylindrical sleeve portion 46 which terminates a short distance above the aforementioned valve seat 40 in the sleeve 38. Seated within this lower sleeve portion 46 is a generally cylindrical sleeve insert 48. A valve seat 49 is formed on the lower, inner periphery of the insert 48.

The upper cylindrical sleeve portion 50 of the sleeve 45 has a series of radially disposed apertures 52 extending through it. These radially disposed apertures 52 place an upper passage section 53 of the inlet passage 27, as defined above the valve seat 49, in communication with a bypass passage 60 through the valve body 26. The significance of this passage 60 will hereinafter be discussed.

Disposed substantially within the lower sleeve portion 46, for movement between the valve seats 49 and 40, is a closure member 65. The closure member 65 is fabricated in the form of a sphere of a plastic material or the like having a density within the range of 0.9 to 0.99. Accordingly, when water fills the passage 27, under static conditions, the member 65 floats to its elevated position wherein it seals against the valve seat 49. The member otherwise descends to seal against the valve seat 40. A middle inlet passage section 66 is thus defined between these seats 49 and 40, and the raw water inlet port 37 enters this passage section. A lower inlet passage section 67 is defined below the valve seat 40.

When, in the operation of the valve arrangement 10, it is desirable that the ball member 65 be held in its lower position against the valve seat 40 (a circumstance hereinafter discussed), a threaded pin 68 extending through the passage end cap 69 is turned downwardly until its lower end (now shown) engages the ball 65 and forces it against the valve seat 40. The pin 68 is turned with the knob 69a on its upper end.

The outlet passage 28 extends from a threaded opening 70 in the top of the valve body 26, downwardly to the port 32 at its lower end. Intermediate the ends of the passage 28, an annular valve seat 71 is formed dividing the passage 28 into an upper outlet passage section 73 and a lower outlet passage section 74.

Extending out of the upper outlet passage section 73 is the soft water outlet port 76. The outlet port 76 is connected to a service outlet line in a well-known manner.

Mounted in the threaded opening 70 at the top of the outlet passage 28 is a conventional check valve assembly 80. The check valve assembly 80 includes an end cap 81 threaded into the opening 70 and having a hollow barrel portion 83 depending therefrom. Slidably mounted in the barrel portion 83 is the valve pin 84 of a valve member 85. A sealing ring 86 on the valve member 85 is biased into engagement with the valve seat 71 in a well-known manner by a coil spring 88 disposed between the valve member 85 and the end of the barrel 83.

It is, as will be recognized, the main valve assembly 20 through which service water flows to and from the treatment tank (not shown), out of and into the service lines. The operation of the main valve assembly 20 is, in itself, broadly conventional. It is, however, described hereinafter in conjunction with the description of the operation of the actuator valve assembly 20 embodying features of the invention.

When the aforementioned timing device signals for regeneration, it is the actuator valve assembly 22 which causes the main valve assembly 20 to halt service with softened water, begin the regeneration cycles and, in addition, begin bypass of hard water to the outlet service line for use during the regeneration period. It is in the construction, arrangement, operation, and relationship of the actuator valve assembly 22 to the main valve assembly 20 that the present invention resides.

The actuator valve assembly 22 comprises a generally cube-shaped plastic body 90 molded in two sections, a base 91 and a head 92. The base 91 and head 92 are joined at a horizontal parting plane 93, where they are held together in a conventional manner by bolts (not shown).

For ease of illustration, the body 90 is shown in layout form. The body 90 actually is attached to the front of the main valve assembly 20 and extends perpendicularly from the plane of the drawing. The body 90 is illustrated split in the middle, on a plane perpendicular to the drawing and laid out on either side of the main valve assembly 20 so that its three-dimensional valve layout can be more easily described. Connections between the actuator valve assembly 22 and the main valve assembly 20 are appropriately split and laid out also for purposes of illustration.

The valve body 90 houses four valves, A—D. Valves A and B are shown on the left and valves C and D on the right in the illustration of the valve assembly 22. Manipulation of the valves A—D by a cam arrangement (not shown) operated by the aforementioned timer is effective to cycle regeneration according to a predetermined schedule.

Valve A comprises a lower valve chamber 95 formed in the base 91 of the body 90 and an upper chamber 96 formed in the head 92. The upper chamber 96 has a smaller diameter than the lower chamber 95. A valve seat 97 is formed on an annular extension of the head 98 which extends into the lower chamber 95 through a sealing O-ring 99. The lower chamber 95 has a smaller diameter subchamber 95a, as will be recognized.

Valve A further comprises a valve pin 100 extending downwardly through an appropriately proportioned bore 101 in the head 92, and through the upper chamber 96. The pin 100 extends through a cover plate 102 on the valve body 90 and an O-ring seal 103 in the head. The pin 100 terminates at its lower end in a valve disc 104.

The valve disc 104 is normally urged against the valve seat 97 by a coil spring 106 disposed between the cover plate 102 and a snapring 108 seated on the upper end of the valve pin 100. The lowermost section of the valve pin 100, which is normally disposed in the upper chamber 96, is reduced in diameter, as at 110, to facilitate liquid flow through said upper chamber.

Valves C and D are identical in construction and arrangement to valve A. Since the components of each of the valves are identical, a repetitious detailed description of these components in valves C and D is considered unnecessary. For ease of identification, corresponding parts in valve C are identified by reference numerals corresponding to those of valve A, plus 100 digits, and corresponding parts in valve D are identified by corresponding reference numerals, plus 200 digits.

The subchamber 95a in the valve A is connected by a horizontal passage 115 to a mating passage 116 in the body 26 of the main valve assembly 20. The passages 115 and 116 meet at an interface 117 between the main valve body 26 and the actuator body 90. An O-ring 118 surrounds the juncture between these passages 115 and 116. The valve bodies 26 and 90 are held together in a suitable manner by conventional bolts (not shown). The passage 116 in the body 26 is in communication with the lower passage section 74 of the outlet passage 28.

The same subchamber 95a is connected by another horizontal passage 125 to the subchamber 295a in the valve D. The passage 125 is illustrated diagrammatically extending outside the body 90 of the valve assembly 22. Recalling that the valve body 90 has been split and laid out for purposes of illustration, however, it should be understood that the passage 125 actually extends through the valve base 91 in connecting the subchambers 95a and 295a. A flow restrictor washer 126 or a solid plug may be mounted in the passage 125, for reasons hereinafter discussed.

The subchamber 195a of the valve C is, in turn, connected by horizontal passage 130 to a corresponding passage 131 in the body 26 of the main valve assembly 20. The passage 131 is in communication with the lower passage section 67 of the inlet passage 27 in the main valve assembly body 26. The passages 131 and 130 are connected at the interface 117 between the bodies 26 and 90 through an O-ring seal 133.

Returning now to valve B, it embodies specific features and functions of the invention. Valve B comprises a lower valve chamber 140 formed in the base 92 of the body 90, and an upper valve chamber 141 formed in the head 92. A valve seat 142 is formed on an annular extension 143 of the head which extends into the lower chamber 140 through a sealing O-ring 144.

The lower chamber 140 is enclosed except for a relatively small diameter aperture 148 in its base which connects it with the passage 115 through the base 91 of the body 90, and a horizontal passage 150 which connects with a corresponding passage 151 in the body 26 of the main valve assembly 20 through an O-ring seal 152 at the interface 117 between the bodies 26 and 90. The passage 151 is in communication with the upper outlet passage section 73 of the outlet passage 28 in the body 26. A flow restrictor washer 154 is mounted in the passage 151.

Valve B further comprises a valve pin 160 extending downwardly and through an appropriately proportioned bore 161 in the head 92 of the body 90, through the upper and lower chambers 141 and 140. A conical tip 162 is formed on the lower end of the pin 160, and an O-ring 163, having an outer diameter slightly greater than the inside diameter of the aforementioned aperture 148, is seated on the pin in a suitably formed seat immediately above the tip 162. When the pin is thrust into its down position, as illustrated in FIG. 2, for example, the O-ring 163 seals off the aperture 148.

A central section 166 of the pin 160 is reduced in diameter. At the lower end of the reduced diameter section 166, a valve disc 167 is mounted on the pin 160. The valve disc 167 is adapted to seat against the valve seat 142 when the pin 160 is biased into its up position.

The pin 160 extends through the cover plate 102 and an O-ring seal 170 in the head 92 of the body 90. A coil spring 171 disposed between the cover plate 102 and a snapring 173 mounted on the upper end of the pin 160 normally urges the pin into its uppermost position. The valve disc 167 thus normally seats on the valve seat 142 and the O-ring seal 163 on the tip 162 of the pin is withdrawn from the aperture 148, placing the lower chamber 140 in communication with the passage 115.

The upper chamber 141 in the valve B communicates with a pressure line (not shown) to a venturi nozzle in a brine tank through a passage 180 extending through the head 92 of the body 90. In the illustration, the passage 180 terminates in a nipple 181 on top of the body 90. In practice, however, the passage 180 in the valve body 90 is horizontal in its entirety and actually extends from the side of the body.

The upper chamber 96 of the valve A is, in a similar manner, connected to a brine line (not shown) from the venturi by a passage 185. The passage 185 terminates in a conventional fitting 186 on the side of the body 90, as illustrated, where it connects to the brine line.

The upper chambers 196 and 296 of the valves C and D are connected to a drain line (not shown) through a passage 187 in the head 92 of the valve body 90. The passage 187 terminates in a fitting 188, as illustrated, which forms a connection with the drain line.

The valve arrangement 10 normally maintains the water conditioning system in the "service" setting seen in FIG. 1, whereby water is treated in a conventional softening operation. In this setting of the valve arrangement 10, each of the valves A—D of the actuator valve assembly 22 are in their "up" positions. Accordingly, access to the drain lines and the pressure and brine tank lines is closed. The valve member 65 in the main valve assembly floats to its uppermost position, sealing against the valve seat 49. Hard water enters the inlet port 37, passes downwardly through the bed of resin through the distributor pipe 14. The softened water departs the tank through the distributor pipe 14, and the outlet port 76, past the relief valve assembly 80, to service.

At a predetermined time, the aforedescribed timing device signals regeneration. The timing device manipulates a conventional cam arrangement which is effective on the actuator valve assembly 22 to depress the valve pins 100, 160 and 200, and thus reset the valves A, B and C in their "down" positions. This resetting initiates the "brining" cycle.

In the "brining" cycle of regeneration, resetting of the valve C into its "down" position places the lower inlet passage section 67 of the main valve assembly 20 in communication with the drain line through the passages 131, 130 and 187. This causes an immediate drop in pressure below the valve member 65. The relatively higher pressure above the valve member 65 quickly forces the valve member 65 down onto its lower valve seat 40 and inlet water from the inlet port 37 is redirected upwardly through the sleeve insert 48 and the radial passage 52, through the bypass passage 60, to the outlet port 76 in the outlet passage section 73. The bulk of this bypassing hard water is directed to service so that the householder has water during regeneration.

A portion of this bypass water passes from the outlet passage section 73 through the flow restrictor washer 154 in the passage 151 into the chamber 140 of the valve B. This portion of the bypass water departs the actuator valve assembly body 90 past the "down" valve B through the passage 180 to the pressure line for the venturi nozzle. Brine is entrained in the brine tank in a conventional manner and returns to the actuator valve assembly 22 through the brine line and into the passage 185. The restrictor washer 154 assures positive pressure in the outlet service line and a predetermined flow rate to the pressure line.

Brine from the brine tank entering the actuator valve assembly 22 through the passage 185 passes the valve A in its "down" position and courses through the passage 115 into the lower passage section 74 of the outlet passage 28. This brine passes into the brine tank through the distributor pipe 14, and upwardly through the bed of resin, removing the hardness inducing ions from the bed. This impurity laden water passes upwardly through the baffle 12 and the lower passage section 67 of the inlet passage 27 to the passages 130 and 131 leading to the drain valve C. The drain valve C is in its "down" position permitting the impurity laden water to pass to the drain line through the passage 187.

In the same setting of the valve arrangement 10, a "slow rinse" cycle is normally effected. This slow rinse cycle is actually a continuation of the brining cycle after the available brine has been withdrawn from the brine tank. Continued passage of bypass water through the brine tank after all available brine has been withdrawn therefrom results in the passage of this water through the system in the aforementioned manner without its brine content. A rinsing of the resin bed to remove some of the residual brine and other impurities results.

After a combined brining and slow rinse cycle of predetermined length, the aforementioned timing device is effective, through its cam arrangement, to manipulate the actuator valve assembly 22 in the manner illustrated in FIG. 3 and initiate the "backwash" cycle of regeneration. To change from the brining and slow rinse cycles to the backwash cycles, the valve pins 100 and 160 are released, permitting the coil springs 106 and 171 to urge the valves A and B into their "up" positions. This closes off communication between the main valve assembly 20 and the brine tank.

Only valve C in the actuator valve assembly 22 is then open. The valve member 65 in the main valve assembly 20 remains in its down position. Bypass water continues to flow through the restrictor washer 154 but, since valve B is in its "up" position, this bypass water cannot flow to the pressure line. In its "up" position, however, valve B has retracted the O-ring 163 seal from the aperture 148, and bypass water can flow downwardly into the passage 115. It flows from the passage 115 back into the lower passage section 74 of the main valve assembly outlet passage 28, and down into the treatment tank through the distributor pipe 14. This backwash flow of water additionally removes residual brine and foreign material from the bed of ion exchange resin and carries it up past the drain valve C to drain in the aforedescribed manner.

After a prescribed backwash period, the timing device, through its cam arrangement, is effective to release the valve pin 200 and allow the valve C to be biased to its "up" position. With all four valves A—D in their "up" positions once more the flow of bypass water in the manner described during backwash builds up pressure beneath the valve member 65 in the main valve assembly 20, causing it to rise immediately onto its seated position against the valve seat 49 in the sleeve insert 48. This is an interim or "pressure buildup" cycle merely to reseat the valve member 65 in its uppermost position and the timing device, through its cam arrangement, immediately follows by depressing the valve pin 300 to move valve D to its "down" position and initiate the "down-flush" cycle of regeneration.

In the down-flush cycle, inlet water flows from the inlet port 37 of the main valve assembly into and through the treatment tank in the same manner as during service. However, with valve D open, rather than forcing the relief valve assembly 80 open to permit this treated water, still bearing the last vestiges of impurities or residual brine from the resin bed, to depart through the outlet port 76 to service, this water passed through the passage 115 in the valve body 90 in the actuator valve assembly 22, the restrictor washer 126 and the passage 125 to drain valve D. This down-flush water passed the "up" drain valve D to the drain line.

During the down-flush cycle, the flow of water to drain is restricted by the flow restrictor washer 126. This assures sufficient backup pressure to cause water to bypass the check valve 80 to service through the outlet port 76. If the down-flush cycle is considered merely a luxury because of the nature of the water being treated, it can be omitted merely by making the restrictor washer 126 a solid plug and moving directly from the pressure buildup to the "soft water refill" cycle.

In the soft water refill cycle, which immediately precedes return to the service cycle, valve D moves to its "up" position, as seen in FIG. 6, while valves A and B of the actuator valve assembly 22 are once again moved to their "down" positions. Because both valves C and D remain closed, the valve member 65 in the main valve assembly 20 is retained in its uppermost sealing relationship against the valve seat 49. Accordingly, hard water entering the inlet port 37 passes through the treatment tank as if during normal service treatment.

In addition to flowing past the check passage assembly 80 to service, however, a portion of this softened water flows both through the passage 115, past the valve A in its "down" position to the brine line, and through the restrictor washer 154 and the passage 150, past the valve B in its "down" position, to the pressure line. This water flowing to the brine line and the pressure line fills the brine tank to a prescribed level with fresh water. At the same time, softened water is in the aforedescribed manner, passing to service through the outlet port 76.

After a prescribed period required for soft water refill of the brine tank, the timing device manipulates its cam arrangement to permit all the valves A—D to move to their "up" positions. Service is once again reinitiated with the valve arrangement 10 in the setting illustrated in FIG. 1.

To complete the description of operation of the valve arrangement 10, it is sometimes desirable to manually bypass hard water to service. Such is the case where extensive lawn sprinkling is being done, for example. By merely screwing the pin 68 down with the knob 69a to force the ball member 65 onto the valve seat 40, this is accomplished.

The construction and operation of the actuator valve assembly 22, and its control of the system through the main valve assembly 20, have now been described in detail. It will be seen that the actuator valve assembly 22 is a simple and compact unit which can readily be combined with any main valve assembly having an inlet and outlet ports and passages, a double acting inlet valve and a check type outlet valve. The main valve assembly might be solenoid operated valves or they might be mechanically operated in one way or another.

Regardless, the actuator valve assembly 22 seats in sealing relationship against an access face suitably formed on a main valve assembly and containing three passages, two into communication with the main valve assembly outlet passage and one into communication with its inlet passage.

The three single acting valves A, C and D, and the one double acting valve B are interconnected with each other, with the brine tank, and with drain means, in such a manner that liquid flow from the main valve inlet to brining and drain is accomplished precisely, yet simply, without a possibility of malfunction. The second valve function of valve B at its tip 162 provides an ultimately simple backwash flow path while assuring that no brine can seep into bypass service during the remainder of regeneration.

While the embodiment described herein is at present considered to be preferred, it is understood that various modifications and improvements may be made therein, and it is intended to cover in the appended claims all such modifications and improvements as fall within the true spirit and scope of the invention.

We claim:

1. In a water conditioning system, an actuator valve assembly for controlling a main valve assembly, comprising:
   a. an actuator valve body;
   b. said body having four valves A—D disposed therein and arranged in substantially parallel relationship;
   c. each of said valves A—D including valve chamber means having a main valve seat formed therein dividing each chamber means into an upper chamber section and a lower chamber section;
   d. each of said valves A—D further including a valve core movable in said body and adapted to be manipulated by actuator means;
   e. each of said valve cores including one valve member adapted to seat on a corresponding main valve seat to close off communication between corresponding upper and lower chamber sections;
   f. first passage means in said adapted to connect the upper chamber section of valve A to a brine tank;
   g. second passage means in said body adapted to connect the upper chamber section of valve B to the brine tank;
   h. third passage means in said body adapted to connect the upper chamber sections of valves C and D to drain means;
   i. fourth passage means in said body adapted to connect the lower chamber sections of valve A, B and D to the main valve assembly;
   j. fifth passage means in said body adapted to connect the lower chamber section of valve C to the main valve assembly;
   k. sixth passage means in said body adapted to connect the upper chamber section of valve B to the main valve assembly; and
   l. a secondary valve seat formed between said lower chamber section of valve B and said fourth passage means;
   m. said valve core in valve B including another valve member adapted to seat on said secondary valve seat and close off communication between said lower chamber section of valve B and said fourth passage means when said valve core in valve B is moved to open communication between said lower chamber section of valve B and said second passage means.

2. The actuator valve assembly of claim 1 further characterized in that;
   a. said other valve member comprises a pin section having a generally conical tip thereon;
   b. and a seal ring encircling said pin section and adapted to seat against said secondary valve seat.

3. The actuator valve assembly of claim 1 further characterized in that:
   a. said body is fabricated of plastic and comprises a base member and a head member joined together at a parting plane;
   b. said upper valve chambers being formed in said head member and said lower valve chamber being formed in said base member.

4. The actuator valve assembly of claim 3 further characterized in that:
   a. said head member includes an annular shoulder encircling each upper chamber section on said parting plane;
   b. each of said annular shoulders extending into a corresponding lower chamber section;
   c. said main valve seat being formed on corresponding annular shoulders.

PO-1050
(5/69)

UNITED STATES PATENT OFFICE
CERTIFICATE OF CORRECTION

Patent No. 3,547,151      Dated December 15, 1970

Inventor(s) Benjamin H. Kryzer and Edward J. Tischler

It is certified that error appears in the above-identified patent and that said Letters Patent are hereby corrected as shown below:

Column 1, line 23, delete " "-" ".
         Line 53, after "suitable", insert --timing--

Column 6, line 45, delete " "-" "

Column 8, line 52, after "said" insert --body--

Signed and sealed this 13th day of April 1971.

(SEAL)
Attest:

EDWARD M. FLETCHER, JR.          WILLIAM E. SCHUYLER, JR.
Attesting Officer                 Commissioner of Patents